April 7, 1925.

A. L. GIBBS 1,532,399

REFRIGERATING APPARATUS

Filed April 19, 1923

WITNESSES

Inventor
ALONZO L. GIBBS

By Richard B. Owen
Attorney

Patented Apr. 7, 1925.

1,532,390

UNITED STATES PATENT OFFICE.

ALONZO L. GIBBS, OF NEW YORK, N. Y.

REFRIGERATING APPARATUS.

Application filed April 19, 1923. Serial No. 633,285.

*To all whom it may concern:*

Be it known that I, ALONZO L. GIBBS, a citizen of the United States, residing at New York city, in the county of New York and State of New York, have invented certain new and useful Improvements in a Refrigerating Apparatus, of which the following is a specification.

The present invention relates to new and useful improvements in generators used in conjunction with a refrigerating apparatus and has for its primary object the provision of means whereby weak liquor is separated from ammonia gas in the generators and the retention of the weak liquor separate from the charge of aqua ammonia in the generators.

Another important object of the invention resides in the provision of heating means associated directly with the generator so that the maximum amount of heat will be transmitted to the contents thereof with the result of a more thorough separation of anhydrous gas from the liquid ammonia.

A further object of the invention is to improve the construction of the generators shown in my copending application, Serial No. 454,188, relating to an apparatus for refrigeration, and the consolidation of the heating means for the aqua ammonia with the generating means disclosed in said pending application.

A still further object of the invention resides in the provision of a novel arrangement of elements in the generators whereby weak liquor will be retained at a very high temperature so that it will absorb a very small percent of anhydrous with the consequence that I am able to obtain a difference of about eighty percent between the liquors, whereas in old apparatus the maximum difference of percentage between the liquor ranged from fifteen to twenty percent.

Another object of the invention resides in the provision of a generator of the above character which is strong, durable, inexpensive to manufacture and one which is highly efficient in practice.

Other objects and advantages of the invention will become apparent during the course of the following description.

Figure 1:
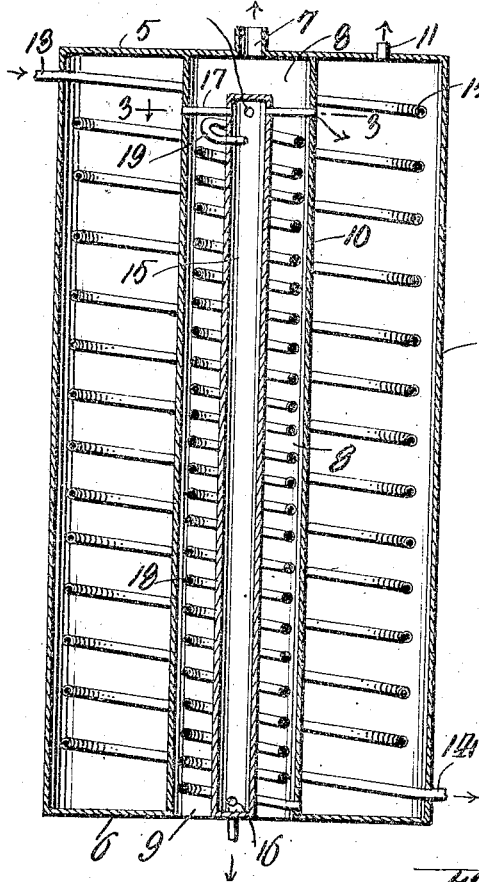
Figure 2:
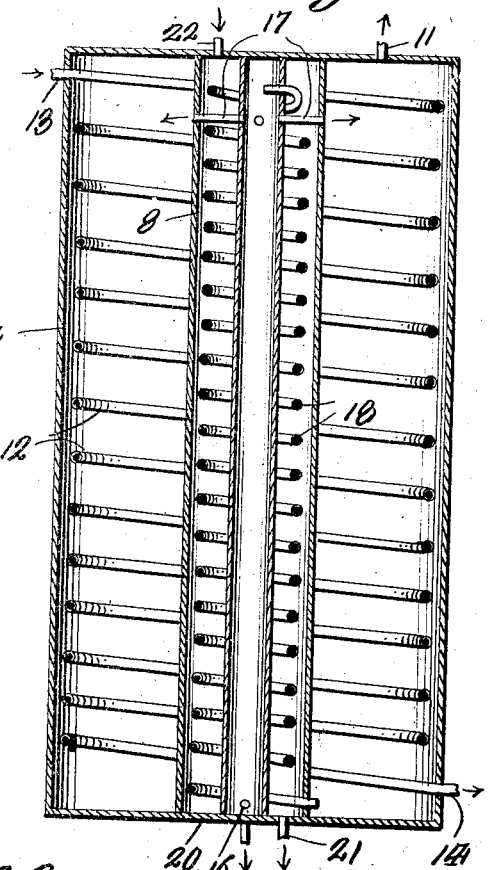
Figure 3:
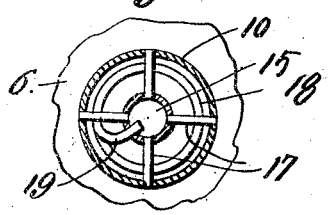

In the accompanying drawings forming a part of the application, and wherein like numerals are employed to designate like parts throughout the several views:

Figure 1 is a vertical central longitudinal section taken through one form of my improved generator tank, Figure 2 is a similar view of a modified form of tank, and Figure 3 is a fragmentary horizontal section taken on the line 3—3 of Figure 1.

The present invention relates to improvements in the generator tanks 1 and 2 shown in my copending application for an apparatus for refrigeration, Serial No. 454,188, filed March 21, 1921, and in order to consolidate the heaters 3 in my above mentioned pending application with the generator tanks 1 and 2 of said application, I provide a tank 4, which is cylindrical in the present instance, but not necessarily so, and is provided with a closed top 5 and corresponding bottom 6. The top of this tank is provided with a central opening 7 through which burned products of combustion ensue from a central concentrically arranged heating chamber 8 which extends longitudinally of the generator tank 4 and from one end thereof to the other. It will be noted, however, that the top of the generator tank 4 forms a closed top for the heating chamber 8, and that the bottom of the heating chamber in Figure 1 is open as at 9 for the admission into the heating chamber of a flame from any suitable source. The cylindrical wall 10 of the heating chamber and which may be of any desired shape, renders the chamber separate and distinct from the interior of the generator tank 4 as will be clearly seen.

The top 5 of the generator tank is provided with an outlet port 11 for the passage of anhydrous ammonia gas from the generator to the refrigerating apparatus as shown in my hereinbefore mentioned copending application. Within the generator tank is disposed a vertical coil 12 having its inlet end 13 carried adjacent the top of the tank and extending through a side thereof, while its discharge or outlet end 14 is extended out through the side of the tank adjacent the bottom thereof. This coil is adapted to conduct cool water through the generator tank when it is desired to cool the contents thereof, or steam when it is desired to heat the contents of the tank to a very high temperature.

Arranged within the heating chamber 8 and extending longitudinally thereof is a weak liquor receiving means or receptacle 15 which in the present instance assumes the form of a stand pipe having both ends or its top and bottom closed as shown. The bottom of the weak liquor receptacle 15 is arranged flush with the bottom of the generator tank, while the top of this receptacle is spaced a distance below the top of the tank for obvious reasons. A port or outlet 16 is provided at the lower end of the weak liquor receptacle 15 for the outlet of weak liquor so that it can be conducted to a cooler or absorber or any other desired place.

The upper end of the weak liquor receptacle communicates with the same end of the generator tank 4 by means of short tubes 17 extending through the walls of the heating chamber and weak liquor receptacle and form passages for ammonia gas from the weak liquor receptacle to the generator tank.

A heating coil 18 is arranged vertically in the heating chamber 8 and has its inlet end extending through the wall of the heating chamber to communicate with the bottom of the generator tank 4, while its upper outlet end is extended into the top of the weak liquor receptacle 15 as shown at 19 below the gas tubes 17. The convolutions of this coil are spaced from the walls of the heating chamber and the weak liquor receptacle 17 as shown.

In the modification shown in Figure 2, the arrangement of parts is practically the same as the form shown in Figure 1 with the exception of the lower end of the heating chamber being closed as at 20 and the said closed end being provided with an outlet 21. The top of the weak liquor receptacle 15 instead of terminating short of the top of the generator tank, extends to meet the same and a portion of the top of the tank 4 forms a closure for the top of the weak liquor receptacle. The top of the heating chamber is provided with an inlet port 22 through which a heating medium, such as steam may be ejected into the heating chamber. This heating medium has its outlet through the port 21.

In operation, the tank contains a supply of aqua ammonia which is caused to enter the heating coil 18 and to move upwardly therein by means of the coil being heated either by a direct flame applied to the lower end of the heating chamber as shown in Figure 1, or the ejection of a heating element into the chamber 8 from the top thereof and in Figure 2. This ammonia being heated to a very high degree, is caused to break up into ammonia gas and weak liquor which are forced out of the upper end 19 of the heating coil into the weak liquor receiving receptacle 15. The weak liquor falls to the lower end of the receptacle, while the ammonia gas passes from the receptacle 15 through pipes or tubes 17 into the top of the generator tank 4 to be released therefrom through ports 11. The pressure of the gas in the weak liquor receptacle 15 forces the weak liquor through the port 16 in the bottom of the receptacle out into the refrigerating apparatus.

The foregoing description and the accompanying drawings have reference to the preferred or approved embodiment of my invention. It is to be understood however that such changes may be made in construction and arrangement of parts, materials, dimensions, etc., as may proved expedient and fall within the scope of the appended claims.

What I claim as new is:

1. A refrigerating apparatus comprising a generator tank, a heating chamber arranged therein, a heating coil within the heating chamber, one end of said heating coil communicating with the generator tank, a weak liquor receiving means situated within the heating chamber, the opposite end of the said heating coil communicating with the liquor receiving means, and a conduit connecting the said liquor receiving means with the said generator tank.

2. A refrigerating apparatus comprising a generator tank, a heating chamber arranged therein, a closed weak liquor receptacle arranged in the heating chamber, a conduit communicating with the weak liquor receptacle and the generator tank, and a heating coil arranged in the heating chamber and having one end communicating with generator tank and its opposite end with the weak liquor receptacle.

3. A refrigerating apparatus comprising a generator tank, a heating chamber situated directly in the tank and having its bottom open, weak liquor receiver means disposed within the heating chamber, a conduit connecting the weak liquor receiver means and the generator tank, and a heating coil disposed within the heating chamber and having one end communicating with the generator tank and its opposite end communicating with the weak liquor receiver means.

In testimony whereof I affix my signature in presence of two witnesses.

ALONZO L. GIBBS.

Witnesses:
 JOHANNA C. MONTÉ,
 HILDEGARDE BEST.